(12) United States Patent
Yukawa

(10) Patent No.: US 11,716,940 B2
(45) Date of Patent: Aug. 8, 2023

(54) PLANT CULTIVATION METHOD, PLANT CULTIVATION SYSTEM, AND RACK

(71) Applicant: PLANTS LABORATORY, INC., Tokyo (JP)

(72) Inventor: Atsuyuki Yukawa, Tokyo (JP)

(73) Assignee: PLANTS LABORATORY, INC., Tokyo (JP)

( * ) Notice: Subject to any disclaimer, the term of this patent is extended or adjusted under 35 U.S.C. 154(b) by 53 days.

(21) Appl. No.: 16/638,599

(22) PCT Filed: Mar. 15, 2018

(86) PCT No.: PCT/JP2018/010322
§ 371 (c)(1),
(2) Date: Feb. 12, 2020

(87) PCT Pub. No.: WO2019/176070
PCT Pub. Date: Sep. 19, 2019

(65) Prior Publication Data
US 2020/0214226 A1  Jul. 9, 2020

(51) Int. Cl.
*A01G 9/02* (2018.01)
*A01G 9/029* (2018.01)
(Continued)

(52) U.S. Cl.
CPC .............. *A01G 9/023* (2013.01); *A01G 7/045* (2013.01); *A01G 9/0299* (2018.02); *A01G 9/247* (2013.01); *A01G 9/249* (2019.05)

(58) Field of Classification Search
CPC ...... A01G 9/023; A01G 9/0299; A01G 9/249; A01G 7/045; A01G 9/247; A01G 31/06; A01G 31/045
See application file for complete search history.

(56) References Cited

U.S. PATENT DOCUMENTS

2013/0255149 A1   10/2013   Jung
2017/0027110 A1    2/2017   Ito et al.
(Continued)

FOREIGN PATENT DOCUMENTS

AU      2004245933 A1   12/2005
CA       1109265 A      9/1981
(Continued)

OTHER PUBLICATIONS

Examination Report No. 1 issued in related Australian Patent Application No. 2018413312 dated Nov. 6, 2020.
(Continued)

*Primary Examiner* — Yvonne R Abbott-Lewis
(74) *Attorney, Agent, or Firm* — Renner, Otto, Boisselle & Sklar, LLP

(57) ABSTRACT

Provided are: a plant cultivation method for improving the crop acreage of plants that are cultivated indoors, a plant cultivation system, and a rack that is comprised in the plant cultivation system. The plant cultivation method of the present invention comprises: setting a cultivation vessel 2 for cultivating a plant P in a rack 1; adjacently arranging a plurality of the racks 1 on a travel line in order of growth of the plant P; intermittently advancing the rack 1 according to a growth state of the plant P; and separating the first rack 1 from the following rack(s) 1, and making a new rack 1 adjacent to the last rack 1 of the following rack(s) 1.

6 Claims, 5 Drawing Sheets

(51) Int. Cl.
*A01G 9/24* (2006.01)
*A01G 7/04* (2006.01)

(56) References Cited

U.S. PATENT DOCUMENTS

| | | | | |
|---|---|---|---|---|
| 2018/0042191 A1* | 2/2018 | Blackburn | ............ | A01G 31/06 |
| 2018/0213735 A1* | 8/2018 | Vail | ........................ | A01G 7/045 |

FOREIGN PATENT DOCUMENTS

| | | | | |
|---|---|---|---|---|
| CN | 2054257 U | 3/1990 | | |
| CN | 102149273 A | 8/2011 | | |
| CN | 102245012 A | 11/2011 | | |
| CN | 106163262 A | 11/2016 | | |
| EP | 1637033 A1 | 3/2006 | | |
| EP | 3257367 A1 * | 12/2017 | ............ | A01G 31/042 |
| EP | 3292750 A1 | 3/2018 | | |
| EP | 3292750 A1 * | 3/2018 | ............ | A01G 31/06 |
| JP | 1225422 | 9/1989 | | |
| JP | 2007252315 A | 10/2007 | | |
| JP | 201178350 A | 4/2011 | | |
| JP | 5224068 B2 | 7/2013 | | |
| JP | 2013146229 A | 8/2013 | | |
| JP | 2016-182040 A | 10/2016 | | |
| JP | 2017112894 A | 6/2017 | | |
| KR | 200453688 | 5/2011 | | |
| KR | 20120112986 A * | 10/2012 | | |
| KR | 20170057685 A * | 5/2017 | | |
| RU | 55249 U1 | 8/2006 | | |
| RU | 142236 U1 | 6/2014 | | |
| WO | 2004108881 A2 | 12/2004 | | |
| WO | 2010014600 A2 | 2/2010 | | |
| WO | 2010044662 A1 | 4/2010 | | |
| WO | WO-2014196744 A1 * | 12/2014 | ............ | A01G 9/1423 |
| WO | WO-2015140493 A1 * | 9/2015 | ............ | A01G 9/249 |
| ZA | 201102433 A | 10/2011 | | |

OTHER PUBLICATIONS

Office Action issued in related Russian Patent Application No. 2020107487 dated Dec. 1, 2020 and its English translation.
Invitation to Respond to Written Opinion and Written Opinion issued in related Singaporean Patent Application No. 11202001345T dated Dec. 3, 2020.
Office Action issued in related Canadian Patent Application No. 3,072,995 dated Apr. 16, 2021.
Office Action issued in related Chinese Patent Application No. 201880053334.1 dated Apr. 16, 2021 and English translation.
Examination Report issued in related Indian Patent Application No. 202017005677 dated Jan. 27, 2021.
International Search Report for related International Application No. PCT/JP2018/010322 dated May 15, 2018 and its English translation.
First Office Action issued in Japanese Patent Application No. 2019-542248 dated Sep. 11, 2019 and its English translation.
Final Office Action issued in Japanese Patent Application No. 2019-542248 dated Dec. 18, 2019 and its English translation.
Office Action and search report issued in related Russian Patent Application No. 2020107487 dated Aug. 3, 2020 and its English translation.
First Office Action for related Indonesian Application No. P00202001430 dated Aug. 13, 2021 and its English Machine Translation.
Second Office Action for related Chinese Application No. 201880053334.1 dated Sep. 16, 2021 and its English Machine Translation.
Extended European Search Report for related European Application No. 18909491.5 dated Sep. 17, 2021.
Notice of Preliminary Rejection for related Korean Application No. 10-2020-7004947 dated Nov. 9, 2021, and its English translation.
Office Action for related Japanese Application No. 2020-006944 dated Apr. 15, 2022 and its English Machine Translation.
Substantive Examination Report for corresponding Philippine Application No. 1/2020/500337 dated Nov. 11, 2022.
Second Office Action for related Canadian Application No. 3,072,995 dated Dec. 16, 2021.
Decision of Refusal for related Chinese Application No. 201880053334.1 dated Feb. 9, 2022 and its English Machine Translation.

* cited by examiner

PLANT CULTIVATION METHOD, PLANT CULTIVATION SYSTEM, AND RACK

TECHNICAL FIELD

The present invention relates to a plant cultivation method for cultivating a plant indoors, a plant cultivation system, and a rack that is used for the plant cultivation system.

BACKGROUND ART

Plants such as vegetables cultivated indoors are commonly shipped after undergoing steps of "seeding", "seedling-raising", "planting" and "harvesting". Various types of exclusive racks for cultivating plants through these steps have been provided. For example, Patent Literature 1 describes a plant cultivation rack unit comprising a movable type rack and a fixed type rack.

The movable type rack comprises a shelf with multiple stages on which a plurality of cultivation vessels are mounted, a first frame fixing said shelf, and a caster fixed to the lower end of said first frame. The fixed type rack comprises a second frame fixed on a floor. The second frame has a space in which two movable type racks are stored side by side. Regarding said plant cultivation rack unit, the movable type rack is taken out from the space of the fixed type rack when plants grown in the cultivation vessels are shipped or moved to a different place.

CITATION LIST

Patent Literature

Patent Literature 1: Japanese Laid-Open Publication No. 2013-146229

SUMMARY OF INVENTION

Technical Problem

The plant cultivation rack unit described in Patent Literature 1 needs a space into which the movable type rack is drawn out in front of the fixed type rack because the movable type rack is taken out from the space of the fixed type rack. Further, when a plurality of plant cultivation rack units are installed so as to be arranged in a plurality of rows, an aisle is provided between adjacent plant cultivation rack units. Thus, plants cannot be cultivated in the space into which the movable type rack is drawn out or in the aisle in an indoor place wherein the plant cultivation rack units are installed, which results in a smaller crop acreage.

The problem to be solved by the present invention is to provide a plant cultivation method for improving the crop acreage of plants that are cultivated indoors, a plant cultivation system, and a rack that is comprised in the plant cultivation system.

Solution to Problem

In order to solve the above problem to be solved, the plant cultivation method of the present invention comprises:
setting a cultivation vessel for cultivating a plant in a rack;
adjacently arranging a plurality of the racks on a travel line in order of growth of a plant;
intermittently advancing the rack according to a growth state of a plant; and
separating the first rack from the following rack(s), and making a new rack adjacent to the last rack of the following rack(s).

In the plant cultivation method of the present invention, a plurality of types of the cultivation vessels may be used, wherein a plant is transplanted to enlarge an interval from an adjacent plant in accordance with each growth state of seeding, seedling-raising, and planting of a plant.

The plant cultivation system of the present invention comprises:
a plurality of racks in which a cultivation vessel for cultivating a plant is set; and
a travel line on which the plurality of racks are arranged in such a manner that the plurality of racks can be in contact or separated, the travel line guiding the plurality of racks to integrally advance,
wherein the first rack can advance away from the following rack(s) in accordance with a growth state of a plant cultivated in the cultivation vessel.

In the plant cultivation system of the present invention, the travel line may comprise a guide rail.

In the plant cultivation system of the present invention, the rack may comprise a caster.

In the plant cultivation system of the present invention, the rack may comprise an illumination means for illuminating a plant cultivated in the cultivation vessel.

In the plant cultivation system of the present invention, the rack may comprise a water supply pipe for supplying water into the cultivation vessel, a water drain pipe for draining water from the cultivation vessel, and a pump for circulating water between the water supply pipe and the water drain pipe.

In order to solve the above problem to be solved, the rack of the present invention
is a rack comprised in the plant cultivation system of the present invention.

Advantageous Effects of Invention

According to the present invention, a plant cultivation method for improving the crop acreage of plants that are cultivated indoors, a plant cultivation system, and a rack that is comprised in the plant cultivation system can be provided.

DESCRIPTION OF EMBODIMENTS

Figure 1:
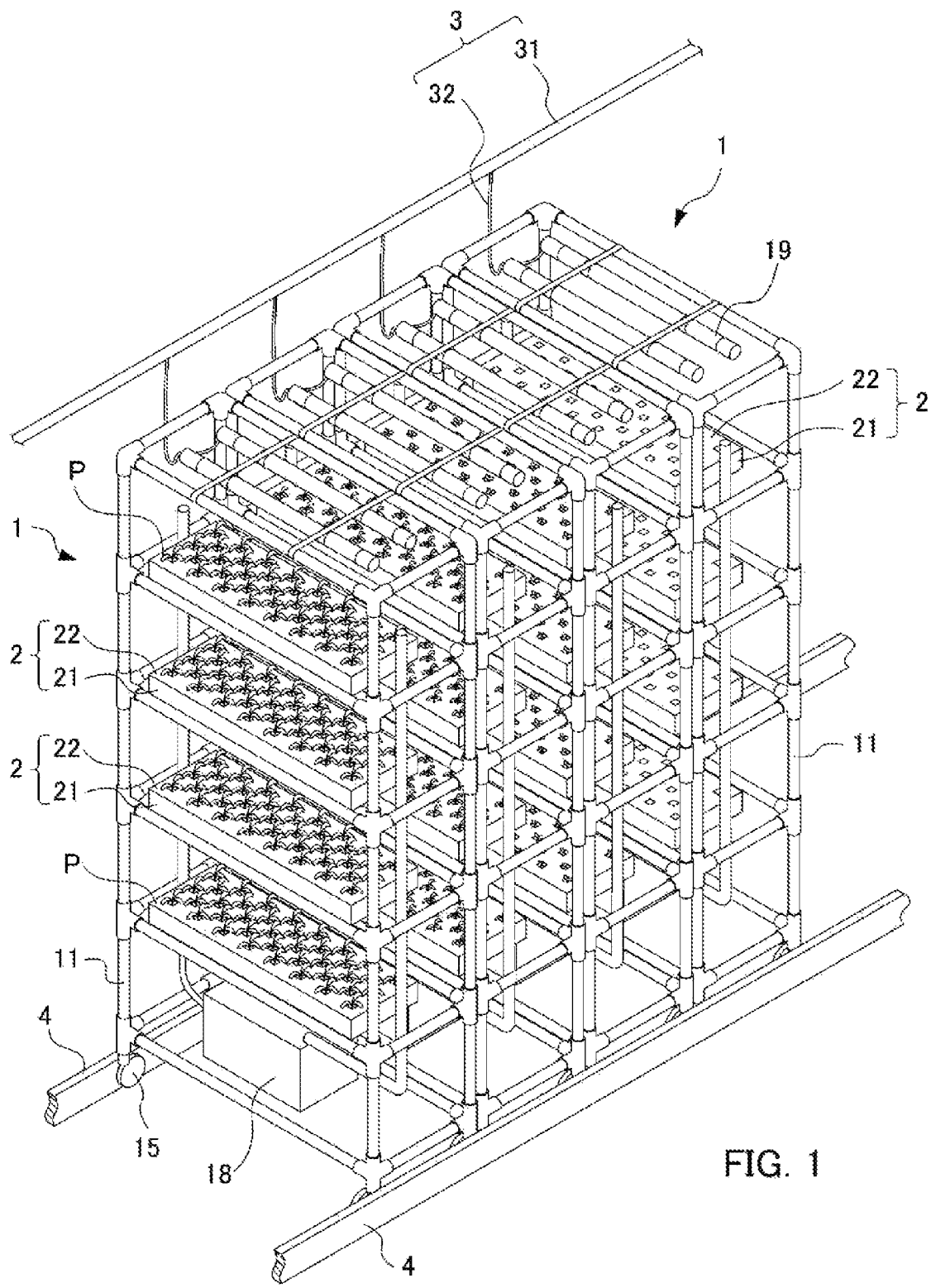
FIG. 1 is a schematic perspective view depicting one embodiment of the plant cultivation system of the present invention.
Figure 2:
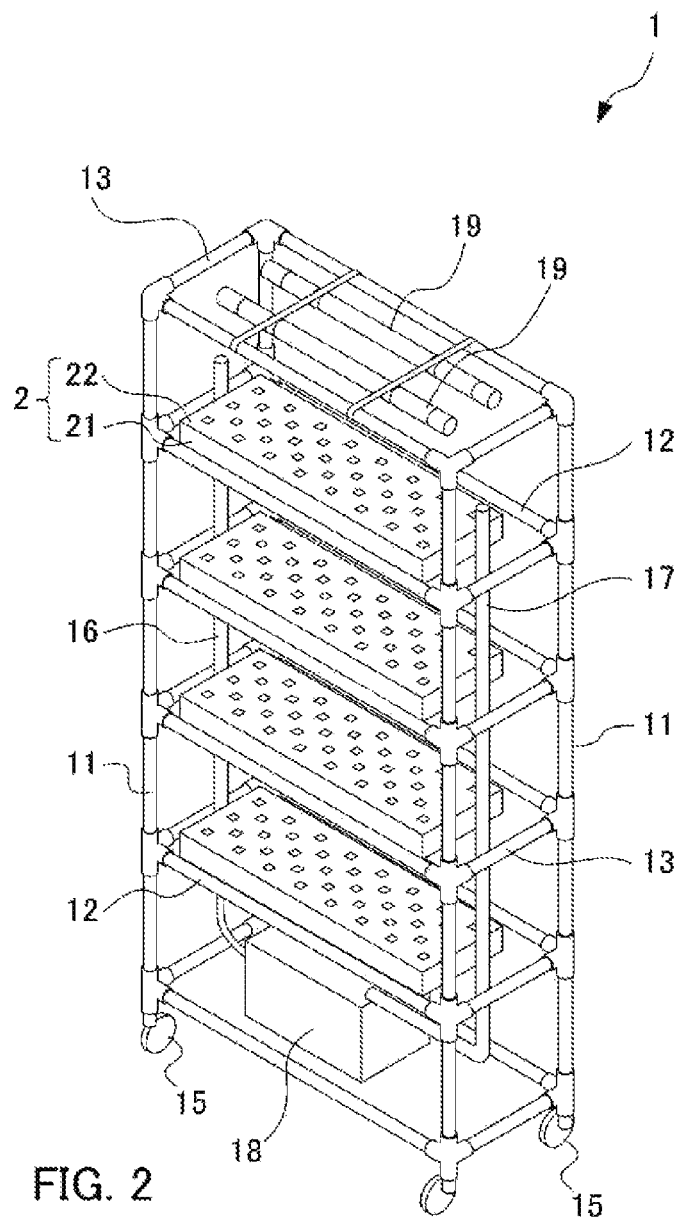
FIG. 2 is a schematic perspective view depicting one embodiment of the rack of the present invention.
Figure 3:
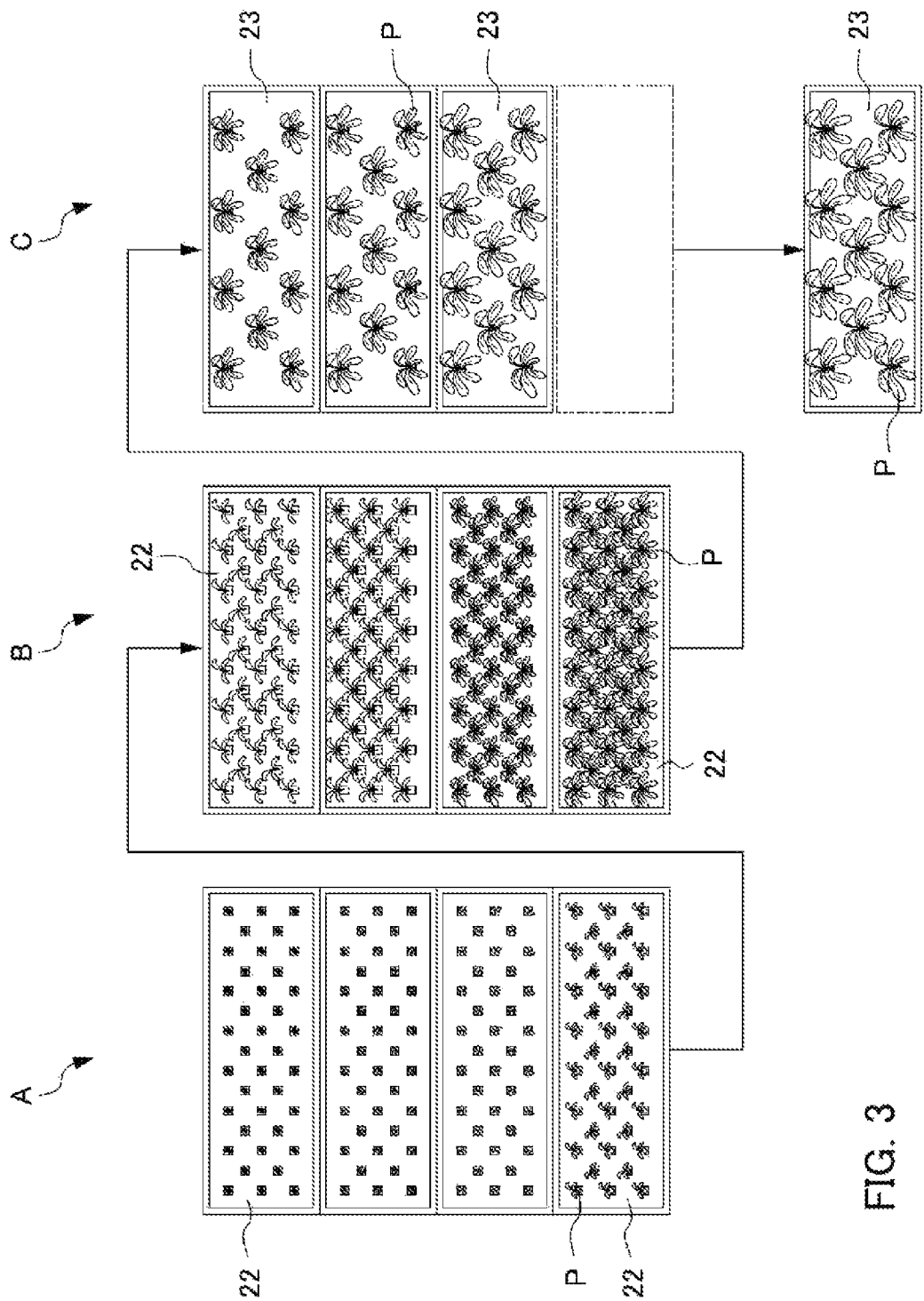
FIG. 3 is a descriptive drawing depicting one embodiment of the plant cultivation method of the present invention.
Figure 4:
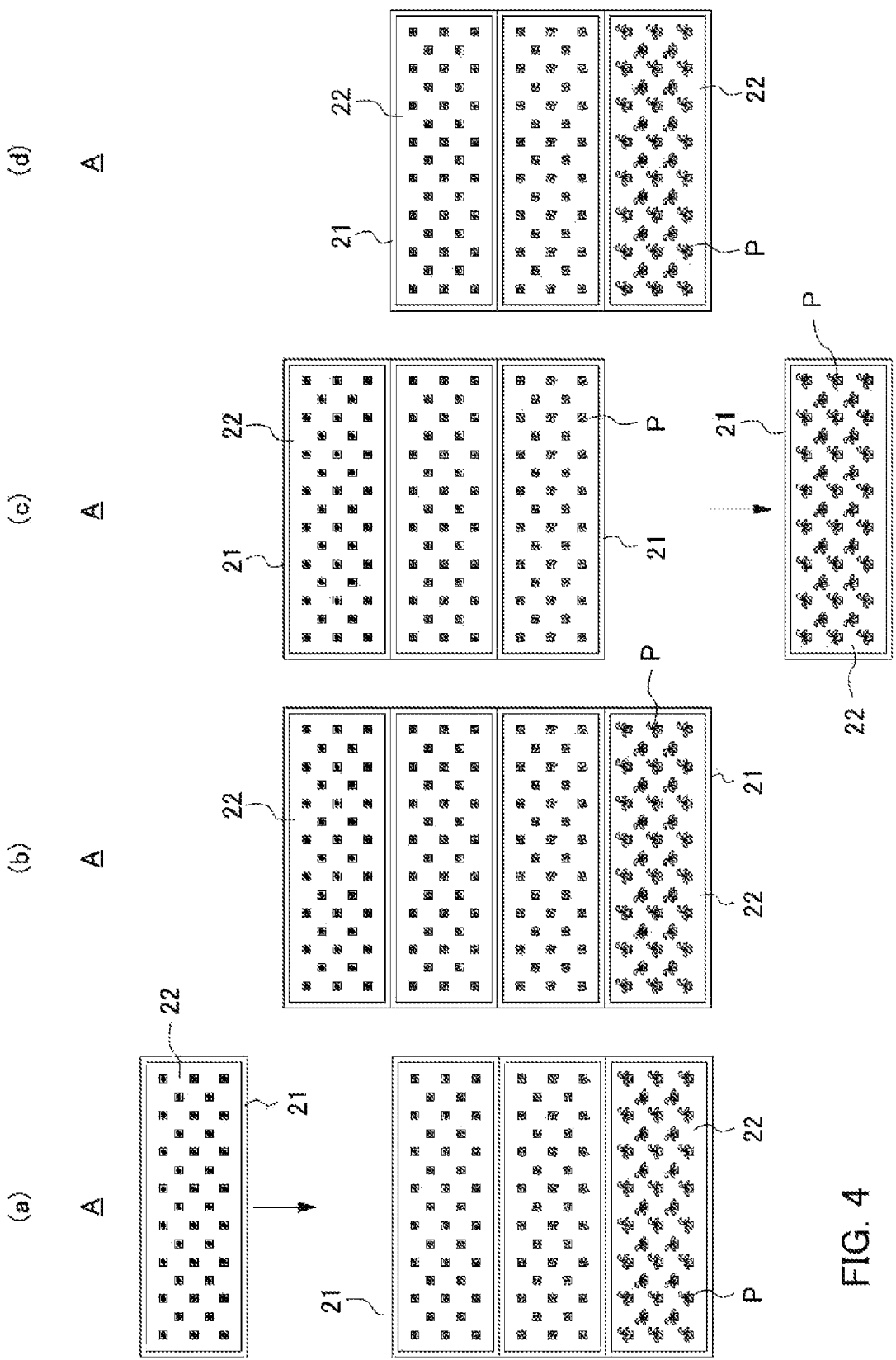
FIG. 4 is a descriptive drawing depicting one embodiment of the travel line for seeding in the plant cultivation method of the present invention, in which (a) depicts the first stage, (b) depicts the second stage, (c) depicts the third stage, and (d) depicts the fourth stage.
Figure 5:
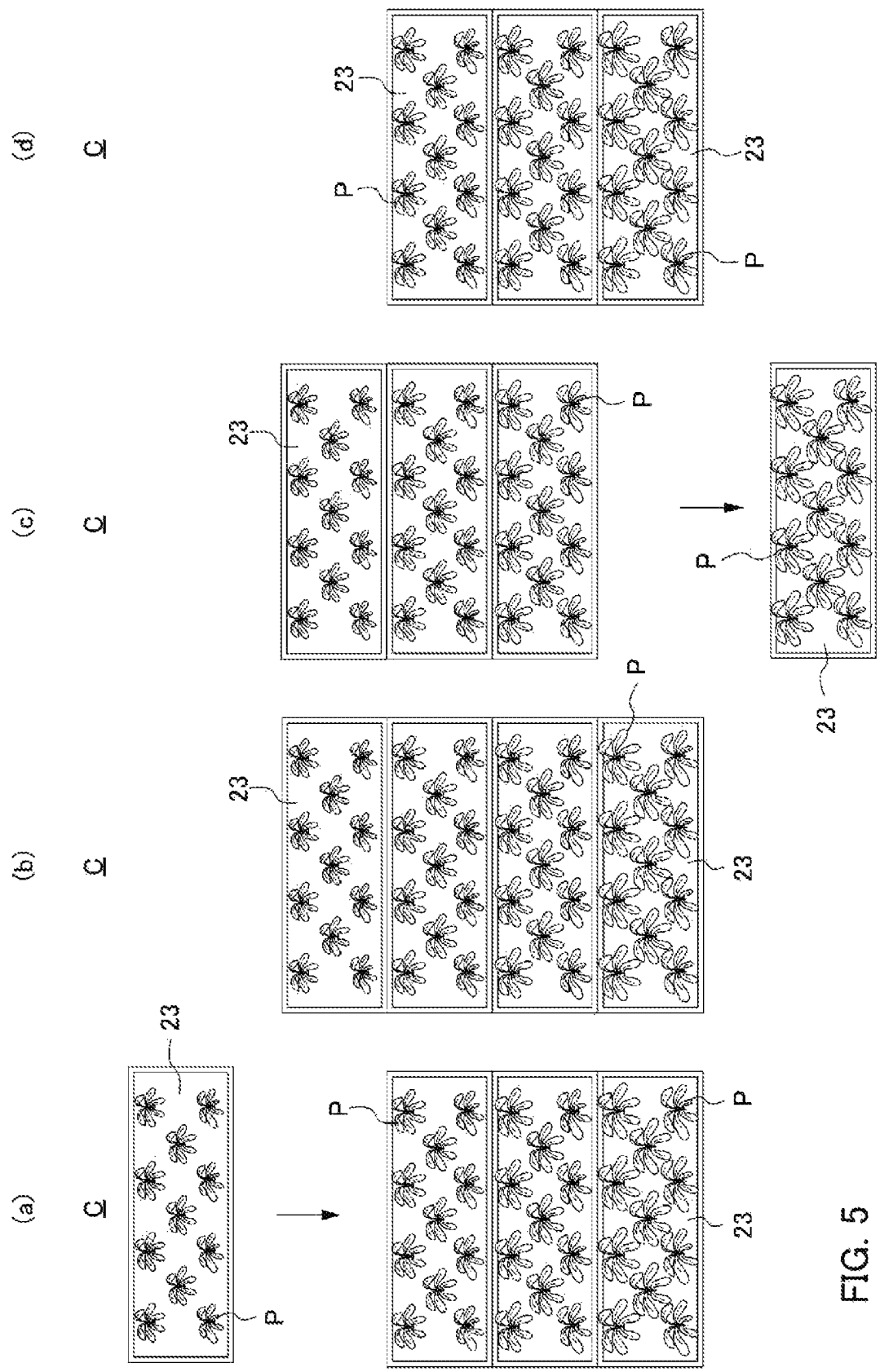
FIG. 5 is a descriptive drawing depicting one embodiment of the travel line for planting in the plant cultivation method of the present invention, in which (a) depicts the first stage, (b) depicts the second stage, (c) depicts the third stage, and (d) depicts the fourth stage.

One embodiment of the plant cultivation system, rack, and plant cultivation method of the present invention is explained with reference to FIGS. 1 to 5. FIG. 1 is a schematic perspective view depicting one embodiment of the plant cultivation system of the present invention. FIG. 2 is a schematic perspective view depicting one embodiment of the rack of the present invention. FIG. 3 is a descriptive drawing depicting one embodiment of the plant cultivation system of the present invention. FIG. 4 is a descriptive drawing depicting one embodiment of the travel line for seeding in the plant cultivation method of the present invention, in which (a) depicts the first stage, (b) depicts the second stage, (c) depicts the third stage, and (d) depicts the fourth stage. FIG. 5 is a descriptive drawing depicting one embodiment of the travel line for planting in the plant cultivation method of the present invention, in which (a) depicts the first stage, (b) depicts the second stage, (c) depicts the third stage, and (d) depicts the fourth stage.

The plant cultivation system comprises a plurality of racks 1 for cultivating a plant P as depicted in FIG. 1. This plant cultivation system is installed indoors, and has travel lines A, B, and C for each of the steps of seeding, seedling-raising, and planting as depicted in FIG. 3. A plurality of racks 1 are arranged on each of the travel lines A, B, and C. The plurality of racks 1 intermittently and detachably move along the travel lines A, B, and C.

The plant P is cultivated in a cultivation vessel 2 set in the rack 1 as depicted in FIG. 1. The cultivation vessel 2 comprises a tray portion 21 for storing water such as fresh water or culture liquid, and a seedling bed palette 22 placed on the bottom surface of the tray portion 21 or a plate-like planting palette 23 that covers the top surface of the tray portion 21 (see FIG. 3).

The seedling bed palette 22 is used in the step of seeding and the step of seedling-raising. The seedling bed palette 22 is formed of sponge or urethane foam. The seedling bed palette 22 has horizontal and vertical slits (not shown) so that the palette can be readily cut into planting segments (not shown) for growing one plant P. A depression (not given a number) on which a seed is placed or a slit (not shown) into which a seed is put is formed at the center of each region surrounded by the slits on the seedling bed palette 22. The seedling bed palette 22 is placed on the bottom surface of the tray portion 21.

The planting palette 23 is used in the step of planting. In the step of planting, the plant P grows big enough to be shipped in a planting segment. The planting palette 23 is a panel with numerous holes. A cultivation pot (not shown) is fit into each hole. A planting segment is put inside the cultivation pot.

Regarding the planting palette 23, the plant P that grows in the step of planting is bigger than the plant P that grows in the step of seeding or seedling-raising. Thus, the interval of numerous holes on the seedling bed palette 22 is larger than the interval of numerous seeds that are sown on the seedling bed palette 22. The number of seedlings cultivated on the planting palette 23 is less than the number of seedlings cultivated in the step of seeding and the step of seedling-raising.

As depicted in FIG. 2, the rack 1 in which the cultivation vessel 2 as described above is set comprises four posts 11, a plurality of pairs of main beams 12 and a plurality of pairs of sub beams 13 that are bridged between two posts 11, a plurality of bars (not shown) that are bridged between a pair of main beams 12, and a caster 15 that is attached to the lower end of each post 11. The four posts 11 are arranged so as to be positioned at the corners of a rectangle in planar view due to a pair of posts with a larger interval and a pair of posts with a smaller interval.

The main beam 12 is bridged between the posts 11 with a larger interval. The sub beam 13 is bridged between the posts 11 with a smaller interval. The main beam 12 and the sub beam 13 are fixed to the posts 11 with a fixed interval in the height direction as well. One cultivation vessel 2 is mounted (set) on the bars bridged between a pair of main beams 12. The illustrated rack 1 is provided with the main beams 12, the sub beams 13, and the bars in four stages so that four cultivation vessels 2 can be set.

The rack 1 comprises a water supply pipe 16 in the vertical direction and a water drain pipe 17 in the vertical direction. The water supply pipe 16 is bridged over the vertically arranged sub beam 13 on the side of the one end of the rack 1. The water supply pipe 16 is attached on the side of an top surface opening in one end of the tray portion 21 so as to supply water such as fresh water or culture liquid into the tray portion 21 of each cultivation vessel 2. The water drain pipe 17 is bridged over the vertically arranged sub beam 13 on the side of the other end of the rack 1. The water drain pipe 17 is attached to the bottom side of the other end of the tray portion 21. While water is supplied into the tray portion 21, water that was not absorbed by the plant P is drained from the water drain pipe 17.

A tank 18 and a pump (not shown) are placed in the lower portion of the rack 1 in order to circulate the water returned to the water drain pipe 17 to the water supply pipe 16. When water is decreased by, for example, being absorbed by the plant P, the tank 18 is replenished with the decreased amount of water.

The rack 1 comprises a light source 19. The light source 19 is attached, for example, on the lower side of a bar in order to equally illuminate the plant P in the cultivation vessel 2. For example, a tubular LED lamp, a flat plate-like LED lamp or the like is employed as the light source 19. Without being limited to two light sources as illustrated, the light source 19 may be one light source or three or more light sources. An LED lamp can emit light with a wavelength suitable for growth of the plant P. A power source line (not shown) for driving the pump or making the light source 19 emit light is wired on the rack 1.

An electric wire 3 for driving the pump or making the light source 19 emit light is installed above the travel lines A, B, and C (e.g., near the ceiling (not shown)). The electric wire 3 has a main wire 31 that is installed in a higher position than the rack 1 in the same direction as the travel line, and a branch wire 32 that branches from the main wire 31 and hangs down toward the rack 1. The branch wire 32 is connected to the main wire 31 so as to be able to follow the movement of the rack 1. The power source line wired on the rack 1 comprises an outlet (not shown) connecting with the branch wire 32.

Regarding the rack 1 as described above, a plurality of racks (four racks in the drawings) are arranged in such a manner that they can be in contact or separated on each of the travel line for seeding (hereinafter, referred to as the "seeding line") A, the travel line for seedling-raising (hereinafter, referred to as the "seedling-raising line") B, and the travel line for planting (hereinafter, referred to as the "planting line") C. The racks 1 are in contact or separated on the longer side. The rack 1 intermittently advances on each of the travel lines A, B, and C in accordance with the growth state of the plant P, with the length of the shorter side as one pitch.

The rack 1 advances by being pushed by a worker. In this case, each of the travel lines A, B, and C comprises a stopper for stopping the rack 1 in a predetermined position. However, the caster 15 may be driven by a motor (not shown) and the motor may be controlled by a controlling means. The controlling means drives the motor at a predetermined time for a fixed period of time, and intermittently advances the rack 1 at a fixed pitch. The fixed pitch at which the rack 1 advances is the width of the rack 1.

Each of the travel lines A, B, and C comprises a pair of parallel guide rails 4. The interval of the pair of guide rails 4 is deemed to be almost the same as the length of the longer side of the rack 1. The pair of guide rails 4 are fixed to the floor so as to be in contact with a pair of caster 15 of the rack 1 or the lowest sub beam 13 of the rack 1.

The rack 1 intermittently advances on the seeding line A at a defined pitch for every fixed period of time (e.g., two days) until a seed sown on the seedling bed palette 22 sprouts (e.g., eight days). The plant P which sprouted on the seedling bed palette 22 is much smaller than the plant P which has grown enough to be harvested. Thus, the pitch of the seeds sown on the seedling bed palette 22 is smaller than the pitch of the holes of the planting palette 23.

The seedling bed palette 22 is placed on the bottom surface of the tray portion 21. The cultivation vessel 2 in which the seedling bed palette 22 is placed on the bottom surface of the tray portion 21 is placed (set) on the bar of the rack 1.

The rack 1 intermittently advances on the seedling-raising line B at a defined pitch for every fixed period of time (e.g., two days) until the seedling which sprouted on the seedling bed palette 22 grows, namely, until the root grows, the stem becomes thicker, and a leaf develops (e.g., eight days). The seedling bed palette 22 and the tray portion 21 that are used for the seedling-raising line B are the same as the seedling bed palette 22 and the tray portion 21 that were used for the seeding line A. Thus, the rack 1 that moved on the seeding line A directly moves to the seedling-raising line B. Alternatively, the cultivation vessel 2 set in the rack 1 on the seeding line A is transferred to (set in) the rack 1 of the seedling-raising line B.

The rack 1 intermittently advances on the planting line C at a defined pitch for every fixed period of time (e.g., one day) until the plant P which grew on the seedling-raising line B is further grown and harvested (e.g., 16 days). The cultivation vessel 2 in which the planting palette 23 covers the top surface of the tray portion 21 is used on the planting line C. A cultivation pot is fit into a hole on the planting palette 23 of the cultivation vessel 2. A planting segment produced by cutting the seedling bed palette 22 is put inside the cultivation pot. One plant P grows in each planting segment. The cultivation vessel 2 in which the cultivation pot is set is set in the rack 1 of the planting line C.

In this regard, a plant cultivation method by the plant cultivation system of the present invention is explained with reference to FIGS. 3 to 5.

First, seeds are sown on a seedling bed palette 22. The seeds are sown at a defined pitch on a depression or in a slit of the seedling bed palette 22. Next, a cultivation vessel 2 in which the seedling bed palette 22 with sown seeds thereon is placed on the bottom surface of a tray portion 21 is set in a rack 1. The cultivation vessel 2 is set on a plurality of stages (four stages in the drawings) in the rack 1. This rack 1 is arranged at the tail end of a plurality of racks 1 (three racks in the drawings) arranged on a seeding line A as depicted in FIG. 4(*a*). Thus, cultivation is performed on the seeding line A in the state wherein four racks 1 are arranged as depicted in FIGS. 1 and 4(*b*).

A water supply pipe 16 and a water drain pipe 17 are attached to the tray portion 21 in the rack 1 which is arranged at the tail end as depicted in FIG. 2. Fresh water is stored in a tank 18 comprised in the rack 1. Fresh water circulates between the water supply pipe 16 and the water drain pipe 17, and the seedling bed palette 22 in the cultivation vessel 2 soaks in fresh water.

A water supply pipe 16 and a water drain pipe 17 are also connected to each tray portion 21 of the three racks 1 that are already arranged. A branch wire 32 of an electric wire 3 is connected to the rack 1 which is arranged at the tail end by an outlet comprised in a power source line. A power source line and a branch wire 32 of the electric wire 3 are also connected to the three racks 1 that are already arranged. Connection of the power source line to the branch line 32 of the electric wire 3 triggers a pump to drive, fresh water to circulate, and a light source 19 in the rack 1 to illuminate the seedling bed palette 22.

As days elapse, the seeds sown on the seedling bed palette 22 sprout. When the racks 1 on the seeding line A advance by one pitch for example every two days, the rack 1 arranged at the tail end advances to the head on the sixth day as depicted in FIG. 4(*b*). The racks 1 advance straight along a guide rail 4. The four racks 1 integrally advance. The racks 1 smoothly advance by a caster 15. When the racks 1 on the seeding line A advance, the branch lines 32 of the electric wire 3 follow.

After a plant P in the rack 1 arranged at the head is cultivated for a fixed period of time, for example, two days, the plant moves away from the seeding line A to a seedling-raising line B as depicted in FIG. 4(*c*). When this rack 1 moves away from the seeding line A, the branch wire 32 of the electric wire 3 is pulled out from the outlet of the power source line. The position at the head of the seeding line A will have an empty space. The plant P sown on the seedling bed palette 22 in the first rack 1 has started to develop a leaf and has grown to be a small seedling.

Next, the three arranged racks 1 integrally advance by one pitch to make the tail end to have an empty space as depicted in FIG. 4(*d*). A new rack 1 is arranged in this space at the tail end as depicted in FIG. 4(*a*).

The rack 1 which moved away from the seeding line A is arranged at the tail end of the seedling-raising line B as depicted in FIG. 3. The power source line of this rack 1 and the branch wire 32 of the electric wire 3 of the seedling-raising line B are connected. Culture liquid is stored in the tank 18 of this rack 1. The culture liquid circulates in the tray portion 21 by the water supply pipe 16 and the water drain pipe 17. The rack 1 also intermittently advances for every fixed period of time, for example, every two days, in the seedling-raising line B in the same manner as the seeding line A depicted in FIG. 4.

The racks 1 arranged on the seedling-raising line B intermittently advance while being restricted by the guide rail 4. The racks 1 smoothly advance by the caster 15. The plant P in the cultivation vessel 2 grows by the culture liquid and the light source 19. For example, when the racks 1 advance by one pitch every two days, the rack 1 arranged at the end advances to the head in six days. After the plant P in the cultivation vessel 2 stored in the first rack 1 grows for two days, the plant moves away from the following rack(s) 1 and moves from the seedling-raising line B to a planting line C. Upon doing so, the branch wire 32 of the electric wire 3 is removed from the outlet of the rack 1.

Upon movement of the plant P to the planting line C, the seedling bed palette 22 is cut along a slit and separated into a planting segment. The planting segment is put inside a cultivation pot. This cultivation pot is fit into a hole made on a planting palette 23. This planting palette 23 covers the top surface of the tray portion 21, thereby setting the cultivation vessel 2. This cultivation vessel 2 is configured in such a manner the number of holes on the planting palette 23 is less than the number of depressions on the seedling bed palette 22 so that the plants P which have grown bigger will not be located densely.

This cultivation vessel 2 is stored in the rack 1 on the planting line C as depicted in FIG. 5. Four racks 1 are arranged on the planting line C as well. Namely, three racks 1 are arranged and a new rack 1 is arranged in the space at the tail end as depicted in FIG. 5(a). As depicted in FIG. 5(b), the plant P on this travel line for planting grows enough to be cultivated in a fixed period of time (e.g., 16 days). Thus, one pitch of advancement is made every four days. The racks 1 intermittently advance along the guide rail 4. The racks 1 smoothly advance by the caster 15.

The water supply pipe 16 and the water drain pipe 17 comprised in the rack 1 on the planting line C are attached to the tray portion 21 of the cultivation vessel 2 stored in this rack 1. Nutrient liquid for planting is supplied from the water supply pipe 16 into the tray portion 21, and drained from the water drain pipe 17. The lower portion of the cultivation pot soaks in the nutrient liquid inside the tray portion 21.

The last rack 1 advances to the head on the 12th day. In four days, the plant P of the first rack 1 grows enough to be harvested. As depicted in FIG. 5(c), the first rack 1 in which the plant P is ready to be harvested advances away from the following rack(s) 1. Upon doing so, the branch wire 32 of the electric wire 3 is removed from the power source line of the rack 1, and the water supply pipe 16 and the water drain pipe 17 are removed from the tray portion 21. The cultivation vessel 2 stored in the first rack 1 is taken out from the rack 1. The cultivation pot of this cultivation vessel 2 is pulled out from the hole of the plate and shipped.

Three racks advance to form a space at the tail end as depicted in FIG. 5(d). A new rack 1 transferred from the seedling-raising line B is arranged in this space as depicted in FIG. 5(a).

While an embodiment of the plant cultivation system, rack 1 and plant cultivation method of the present invention have been explained above, the present invention is not limited to the above-described embodiment. The present invention encompasses modification or improvement within the scope that can solve the problem to be solved of the present invention.

For example, in the above-described embodiment, the rack 1 was advanced to cultivate the plant P in all of the steps of seeding, seedling-raising, and planting of the plant P. However, the rack 1 may be used only in any of the steps to cultivate the plant P. Further, the number of racks 1 arranged in each step and the number of cultivation vessels 2 stored in each rack 1 can be optionally changed.

In the above-described embodiment, the travel lines A, B, and C are described to comprise a pair of guide rails 4. However, the travel lines may comprise one guide rail 4, and protrusions that sandwich this one guide rail 4 from both sides may be provided to the bottom surface of the rack 1. Furthermore, a guide rail 4 can be omitted by the caster 15 having the function of only enabling a straight advancement of the rack 1. In contrast, a caster 15 can be omitted by the guide rail 4 comprising a groove and the rack 1 comprising a foot portion which fits in this groove in point contact.

In the above-described embodiment, the electric wire 3 comprises a main wire 31 installed near a ceiling and a branch wire 32 that branches from the main wire 31. However, although not shown, the electric wire 3 may comprise one main wire and a sub wire connected between adjacent racks 1, and the sub wire at the head may be connected to the main wire. Furthermore, the rack 1 may comprise a battery so as not to install the electric wire 3.

Further, although not shown, the plant cultivation system may comprise a feeding apparatus instead of the electric wire 3. The feeding apparatus comprises a duct, a mobile body or the like. The duct is a duct hanger which is disposed near the ceiling, and has a groove portion which opens downwardly as in a lip channel steel (C-steel) and a pair of lips which are formed on both sides of this groove portion. The mobile body comprises a roller which rolls over the pair of lips, and a hanging portion which hangs down from the rotational axis of this roller and moves while protruding from the groove portion. The hanging portion is connected to the power source line of the rack 1. The feeding apparatus is connected to the power source, and keeps energizing the light source 19 or a pump in the rack 1 even if the rack 1 moves. Alternatively, the feeding apparatus may use the guide rail 4 as a feeding means.

In the above-described embodiment, water was circulated by the water supply pipe 16 and the water drain pipe 17. However, for example, when water gets muddy, water that flowed in the tray portion 21 may be drained out of the rack 1 without circulating the water.

In the above-described embodiment, the plant P was transplanted to enlarge an interval from an adjacent plant P in the steps of seeding and seedling-raising and the step of planting. However, the interval between adjacent plants P may be always constant without being changed.

In the above-described embodiment, the posts 11 of adjacent racks 1 were configured to be detachable, namely, the full length of a post 11 is in contact with or separated from the full length of an adjacent post 11. However, the rack 1 may be provided with protrusions (not shown) on the side on which a post 11 and a post 11 face each other to configure these protrusions to be in contact or separated.

The cultivation vessel 2 set in the rack 1 does not need to be one cultivation vessel corresponding to the width of the rack 1. Instead, said cultivation vessel may be divided into a plurality of cultivation vessels. Further, the racks 1 do not need to move one by one. A plurality of racks 1 may move as one set. Further, the length of the rack 1 in the moving direction may be extended, and the side of the cultivation vessel 2 which is perpendicular to the moving direction may be made parallel to the moving direction in order to set a plurality of cultivation vessels 2 in the rack 1.

In summary, the plant cultivation method of the present invention comprises:

setting a cultivation vessel 2 for cultivating a plant P in a rack 1;

adjacently arranging a plurality of the racks 1 on a travel line in order of growth of the plant P;

intermittently advancing the rack 1 according to a growth state of the plant P; and separating the first rack 1 from the following rack(s) 1, and making a new rack 1 adjacent to the last rack 1 of the following rack(s) 1.

According to this plant cultivation method, a plurality of the racks 1 in which the cultivation vessel 2 is set are adjacently arranged on the travel lines A, B, and C, the rack 1 intermittently advances according to the growth state of the plant P, the first rack 1 is separated from the following rack(s) 1, the crop acreage can be thereby increased.

In the plant cultivation method of the present invention, a plurality of types of the cultivation vessels 2 may be used, wherein the plant P is transplanted to enlarge an interval from an adjacent plant P in accordance with each growth state of seeding, seedling-raising, and planting of the plant P.

According to this plant cultivation method, the plant can be planted with a smaller interval and grown because the plant has no leaf or has a small leaf in the growth state of seeding and seedling-raising. Once the plant gets a bigger leaf, the plant can be planted with a larger interval and grown.

The plant cultivation system of the present invention comprises:

a plurality of racks 1 in which a cultivation vessel 2 for cultivating a plant P is set; and a travel line on which the plurality of racks 1 are arranged in such a manner that the plurality of racks 1 can be in contact or separated, the travel line guiding the plurality of racks 1 to integrally advance, wherein the first rack 1 can advance away from the following rack(s) 1 in accordance with a growth state of the plant P cultivated in the cultivation vessel 2.

According to this plant cultivation system, the cultivation vessel 2 for cultivating the plant P is set in the rack 1, a plurality of the racks 1 are adjacently arranged, and the first rack 1 advances away from the following rack(s) 1, the crop acreage can be thereby increased.

In the plant cultivation system of the present invention, the travel line may comprise a guide rail 4.

According to this plant cultivation system, the rack 1 can be configured to advance along the guide rail 4 by the travel line comprising the guide rail 4.

In the plant cultivation system of the present invention, the rack 1 may comprise a caster 15.

According to this plant cultivation system, the rack 1 can be configured to smoothly advance by the rack 1 comprising the caster 15.

In the plant cultivation system of the present invention, the rack 1 may comprise an illumination means for illuminating the plant P cultivated in the cultivation vessel 2.

According to this plant cultivation system, the growth of the plant P can be accelerated by the illumination means illuminating the plant P cultivated in the cultivation vessel 2.

In the plant cultivation system of the present invention, the rack 1 may comprise a water supply pipe 16 for supplying water into the cultivation vessel 2, a water drain pipe 17 for draining water from the cultivation vessel 2, and a pump for circulating water between the water supply pipe 16 and the water drain pipe 17.

According to this plant cultivation system, water can be saved by the water supplied into the cultivation vessel 2 circulating between the water supply pipe 16 and the water drain pipe 17.

The rack 1 of the present invention is comprised in any plant cultivation system of the above-described present invention.

This rack 1 can be suitably used in a plant cultivation system.

REFERENCE SIGNS LIST

1 rack
2 cultivation vessel
4 guide rail
15 caster
16 water supply pipe
17 water drain pipe
A travel line of seeding (seeding line)
B travel line of seedling-raising (seedling-raising line)
C travel line of planting (planting line)
P plant

The invention claimed is:

1. A plant cultivation system comprising:
a plurality of racks, each of the plurality of racks comprising a plurality of cultivation vessels for cultivating a plant;
a travel line on which the plurality of racks are arranged in such a manner that the plurality of racks can be in contact or separated, the travel line guiding the plurality of racks to integrally advance;
a first electric wire installed along the travel line; and
a plurality of second electric wires which branch from the first electric wire;
wherein each of the plurality of racks comprises: a water supply pipe for supplying water to each of the respective plurality of cultivation vessels; a water drain pipe for draining water from each of the plurality of cultivation vessels; a pump and a tank, provided below the racks, for circulating water between the water supply pipe and the water drain pipe; an illumination means for illuminating a plant cultivated in the plurality of cultivation vessels; and one of the plurality of second electric wires,
wherein the pump is configured so that water supplied from the water supply pipe to the cultivation vessels flows back to the water supply pipe by the pump after returning to the tank via the water drain pipe, so that water can circulate within each of the racks;
wherein the first electric wire and the plurality of second electric wires are electric wires for driving the pump and the illumination means;
wherein the first rack of the plurality of racks can advance away from the following rack(s) of the plurality of racks in accordance with a growth state of a plant cultivated in the plurality of cultivation vessels; and
wherein each of the plurality of second electric wires is connected to the first electric wire so as to be able to follow movement of the rack.

2. The plant cultivation system of claim 1, wherein the travel line is provided on a floor.

3. The plant cultivation system of claim 1, wherein the travel line comprises a guide rail.

4. The plant cultivation system of claim 1, wherein each of the plurality of racks comprises a caster.

5. A plant cultivation method comprising cultivating a plant using the plant cultivation system of claim 1, comprising:
setting the plurality of cultivation vessels in each of the plurality of racks;
adjacently arranging the plurality of racks on a travel line in order of growth of a plant;
intermittently advancing the plurality of racks according to a growth state of a plant; and
separating the first rack of the plurality of racks from the following rack(s) of the plurality of racks, and making a new rack adjacent to the last rack of the following rack(s),
wherein a plurality of types of the plurality of cultivation vessels are used, wherein a plant is transplanted to enlarge an interval from an adjacent plant in accordance with each growth state of seeding, seedling-raising, and planting of a plant, and
wherein a liquid in accordance with each growth state of seeding, seedling-raising, and planting of a plant is supplied to each tank comprised by each of the plurality of racks.

6. The plant cultivation method of claim 5, wherein fresh water is supplied in a seeding state of a plant, culture liquid is supplied in a seedling-raising state of a plant, and a liquid fertilizer for planting is supplied in a planting state of a plant to the tank comprised by each of the plurality of racks.

* * * * *